(12) United States Patent
Ren et al.

(10) Patent No.: US 10,087,920 B2
(45) Date of Patent: Oct. 2, 2018

(54) COMPRESSOR BUSHING

(71) Applicant: QUINCY COMPRESSOR LLC, Bay Minette, AL (US)

(72) Inventors: Tingrong Ren, Quincy, IL (US); Keith Stephens, Quincy, IL (US); Jonathan Rollier, St. Louis, MO (US); Mark Long, Hannibal, MO (US)

(73) Assignee: QUINCY COMPRESSOR LLC, Bay Minette, AL (US)

( * ) Notice: Subject to any disclaimer, the term of this patent is extended or adjusted under 35 U.S.C. 154(b) by 213 days.

(21) Appl. No.: 14/715,167

(22) Filed: May 18, 2015

(65) Prior Publication Data

US 2015/0330381 A1 Nov. 19, 2015

Related U.S. Application Data

(60) Provisional application No. 61/994,690, filed on May 16, 2014.

(51) Int. Cl.
  F16C 33/20 (2006.01)
  F04B 39/02 (2006.01)
  F04B 53/14 (2006.01)
  F16C 33/10 (2006.01)
  F16J 1/16 (2006.01)
  F16C 9/04 (2006.01)
  (Continued)

(52) U.S. Cl.
  CPC .......... *F04B 39/0276* (2013.01); *F04B 35/01* (2013.01); *F04B 37/00* (2013.01); *F04B 39/0022* (2013.01); *F04B 39/0094* (2013.01); *F04B 53/144* (2013.01); *F16C 9/04* (2013.01); *F16C 33/1085* (2013.01); *F16J 1/16* (2013.01); *F16C 33/1045* (2013.01); *F16C 33/1065* (2013.01); *F16C 33/20* (2013.01); *Y10T 16/05* (2015.01); *Y10T 74/2142* (2015.01)

(58) Field of Classification Search
  CPC ......... F16J 1/08; F16J 1/14; F16J 1/16; F16C 9/04; F16C 33/20; F16C 33/201; Y10T 16/05; Y10T 74/2142; F04B 39/0276; F04B 39/0022; F04B 39/0094; F04B 53/144; F04B 37/00; F04B 35/01
  USPC ............... 384/299, 275, 276, 286, 216, 430; 92/187
  See application file for complete search history.

(56) References Cited

U.S. PATENT DOCUMENTS 1,923,597 A * 8/1933 Walker ..................... F01M 9/06
                                                                184/11.1
2,422,327 A * 6/1947 Winslow ................. F16B 21/16
                                                                37/457

(Continued)

OTHER PUBLICATIONS

AST-Bearings (http://dpk3n3gg92jwt.cloudfront.net/domains/ast_units/pdf/ENB-04-0634_A.pdf, dated 2012).*

(Continued)

*Primary Examiner* — Nathan Zollinger
(74) *Attorney, Agent, or Firm* — Bacon & Thomas, PLLC (57) ABSTRACT

A connecting rod assembly including a connecting rod, a bushing with an inner surface and an outer surface, and a pin connectively coupled to the piston and the connecting rod at the small end. The bushing contacts the pin on the inner surface and the connecting rod on the outer surface. The bushing may be self-lubricate when the bushing moves rotationally with respect to the connecting rod.

16 Claims, 6 Drawing Sheets

(51) Int. Cl.
    *F04B 35/01*     (2006.01)
    *F04B 37/00*     (2006.01)
    *F04B 39/00*     (2006.01)

(56) References Cited

U.S. PATENT DOCUMENTS

| | | | | |
|---|---|---|---|---|
| 2,566,080 | A * | 8/1951 | Davids | F16C 9/04 |
| | | | | 384/291 |
| 3,210,137 | A * | 10/1965 | Williams | F16C 33/20 |
| | | | | 184/100 |
| 3,749,415 | A * | 7/1973 | Sampatacos | B60G 7/005 |
| | | | | 280/124.136 |
| 4,567,815 | A * | 2/1986 | Kocher | F01M 1/06 |
| | | | | 384/291 |
| 6,666,581 | B1 * | 12/2003 | Boyer | B23Q 1/40 |
| | | | | 184/6.14 |
| 7,815,701 | B2 * | 10/2010 | Grieve | B01D 41/04 |
| | | | | 55/294 |

OTHER PUBLICATIONS

Craftech Industries (http://info.craftechind.com/blog/bid/259158/Top-5-Materials-for-Plastic-Bearings-Used-on-Metal-Surfaces, dated Apr. 10, 2013).*

* cited by examiner

COMPRESSOR BUSHING

RELATED APPLICATIONS

This application claims priority to U.S. provisional Patent Application No. 61/994,690 filed on May 16, 2014 and titled "Compressor Bushing.' which application is incorporated herein by reference for all that it discloses.

TECHNICAL FIELD

The present application relates generally to gas compressors. More specifically, the present application relates to bushing configurations for use in sour gas compressors.

BACKGROUND

Pressurized gases, such as, air, helium, nitrogen, halogen, natural gas, and the like, have many uses in industry. In general, pressurized gas systems work by providing a receiver, also commonly known as a tank, canister, reservoir, etc., which receives and stores the compressed gas for use at a later time. A discharge on the receiver is accessed to disburse some of the compressed gas from the receiver, which correspondingly reduces the pressure of the gas contained in the receiver.

A gas compressor is a mechanical device used to recharge or pressurize the receiver after a determined volume of pressurized gas has been discharged from the receiver or the receiver pressure has decreased to a predetermined value. The gas compressor is a mechanical device that increases the pressure of gas by reducing its volume. Often, the term gas compressor and air compressor are used interchangeably herein. Many gas compressors draw gas from the ambient atmosphere. In any event, a volume of gas is inducted into the compressor and then mechanically compressed into a smaller volume in the compression chamber. The compressed gas is then discharged from the compressor and stored in a gas receiver. Compressed gas is used for a wide range of applications.

In some applications, a piston compressor may be used to compress the gas. The piston compressor may be a single stage compressor or may have multiple stages. The piston compressor may work by pulling gas into the piston chamber, compressing the gas, and discharging the gas from the piston chamber. The piston compressor may operate under severe conditions when the acting load magnitude and direction fluctuate rapidly. Some piston compressors may also operate under high temperatures and strict lubrication environments.

As can be appreciated, the piston assembly in a piston compressor requires adequate lubrication and strength to withstand the severe operating conditions. Thus, against this background, an improved bushing for piston compressors is needed.

SUMMARY

In one embodiment, a connecting rod assembly is described. The connecting rod assembly may include a connecting rod, a bushing with an inner surface and an outer surface, and a pin connectively coupled to the piston and a connecting rod at a small end. The bushing may contact the pin on the inner surface and the connecting rod on the outer surface. The bushing may self-lubricate when the bushing moves rotationally with respect to the connecting rod.

In another embodiment, the bushing may self-lubricate when the bushing rotationally moves with respect to the pin. The bushing may include a lubricant filled material. In further embodiments, the bushing may include a lubricant-filled thermoplastic. In some embodiments, the bushing may include a lubricant-filled nylon. Further, a wear surface of the bushing may have a coefficient of friction of between 0.1 and 0.2.

In alternative embodiments, a bushing is described. The bushing may include a body. The body may be a hollow cylinder having an outer surface and an inner surface. An external groove may be formed within the outer surface. The external groove may be substantially concentric with the cylinder. At least one internal groove may be on the inner surface of the cylinder. The at least one internal groove may be concentric with the cylinder. A passage may extend through a wall of the cylinder having a first opening proximate the outer surface and a second opening proximate the inner surface. Friction on the body may cause the bushing to self-lubricate.

In another embodiment, the body may include a lubricant-filled thermoplastic. The body may include a lubricant-filled nylon. The lubricant-filled nylon may have a coefficient of friction of between 0.1 and 0.2. The at least one internal groove on the inner surface may include multiple internal grooves, wherein the multiple internal grooves are concentric with the cylinder and are located along the inner surface of the cylinder. The multiple internal grooves may distribute a lubricant along the inner surface when the lubricant is introduce to the bushing. The bushing may further include a lip proximate the second end. The lip may have an outer surface with a diameter larger than the outer surface of the cylinder.

In another embodiment, a compressor system is described. The compressor may include a piston, a crankshaft in mechanical communication with the piston, a connecting rod which may be coupled to the piston at a small end and coupled to the crankshaft at a big end opposite the small end; a pin coupled to the piston and the connecting rod at the small end; and a bushing with an inner surface and an outer surface. The bushing may contact the pin on the inner surface and the connecting rod on the outer surface. The bushing may include a lubricant-filled material. The bushing may self-lubricate when the bushing moves rotationally with respect to the connecting rod.

In some embodiments, rotational movement of the crankshaft may cause reactionary reciprocating movement of the piston. In some instances, the bushing may include a lubricant-filled thermoplastic. The thermoplastic may be a nylon. A wear surface of the bushing may have a coefficient of friction of between 0.01 and 0.2. An inner diameter of the inner surface of the bushing may be greater than an outer diameter of the pin such that coupling the bushing to the pin results in a loose fit. In some instances, the compressor system may be a sour gas compressor system.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The present disclosure is directed to compressor systems such as an air or gas compressor system. The terms "air" and "gas" are used interchangeably throughout the present disclosure. In particular, the present disclosure is directed to a sour gas piston compressor system. The piston compressor system may be a single or multi-piston compressor system. The system may be particularly suited to compress sour gas, but may also be used to compress other gasses. As used in the present disclosure, the term "sour gas" shall be interpreted as including any gas that contains significant amounts of hydrogen sulfide, and more particularly, more than 5.7 milligrams of hydrogen sulfide per cubic meter of natural gas, or approximately 4 ppm by volume under standard temperature and pressure. The disclosure herein may be utilized in general for piston compressor systems or, more specifically for sour gas piston compressor systems. For the purposes of this disclosure, "substantially perpendicular" means forming an angle between 80 degrees and 100 degrees. Also, for the purposes of this disclosure, "substantially cylindrically shaped" means a surface adhering to basic manufacturing structures of cylindricity, roundness, concentricity, and the like. Further, for the purposes of this disclosure, "parallel" means forming an angle within 10.0 degrees of variance.

Gas compressors may operate under vibrations and loads that may cause wear in normal operating conditions. Lubricant may be applied to the compressor to reduce the potential negative effects of such wear. In some operating conditions, externally applied lubrication may not reach all of the components of the compressor. As a result, components of such compressor may be subject to excess wear. Wear may be related to the interactions of two surfaces and may relate to the removal and/or deformation of material on a surface as a result of mechanical action on an opposite surface. The additional and/or increased wear may result in reduced efficiency, or in some situations, failure of the compressor. To aid the lubrication of the components, one or more components may be self-lubricating. For example, components may be infused with a lubricant which may disperse into the compressor system as the components experience wear. The lubricant may fleck or shave off the components. In other embodiments, a more liquid like lubricant may be captured in the composition of the components and may be released as the wear surface of the components becomes energized. The components that are self-lubricating may provide lubrication to themselves as well as providing lubrication to other components. For example, a bushing may include self-lubricating qualities. The bushing may provide its own lubrication, and in some embodiments, the lubrication may reach neighboring components.

Figure 1A:
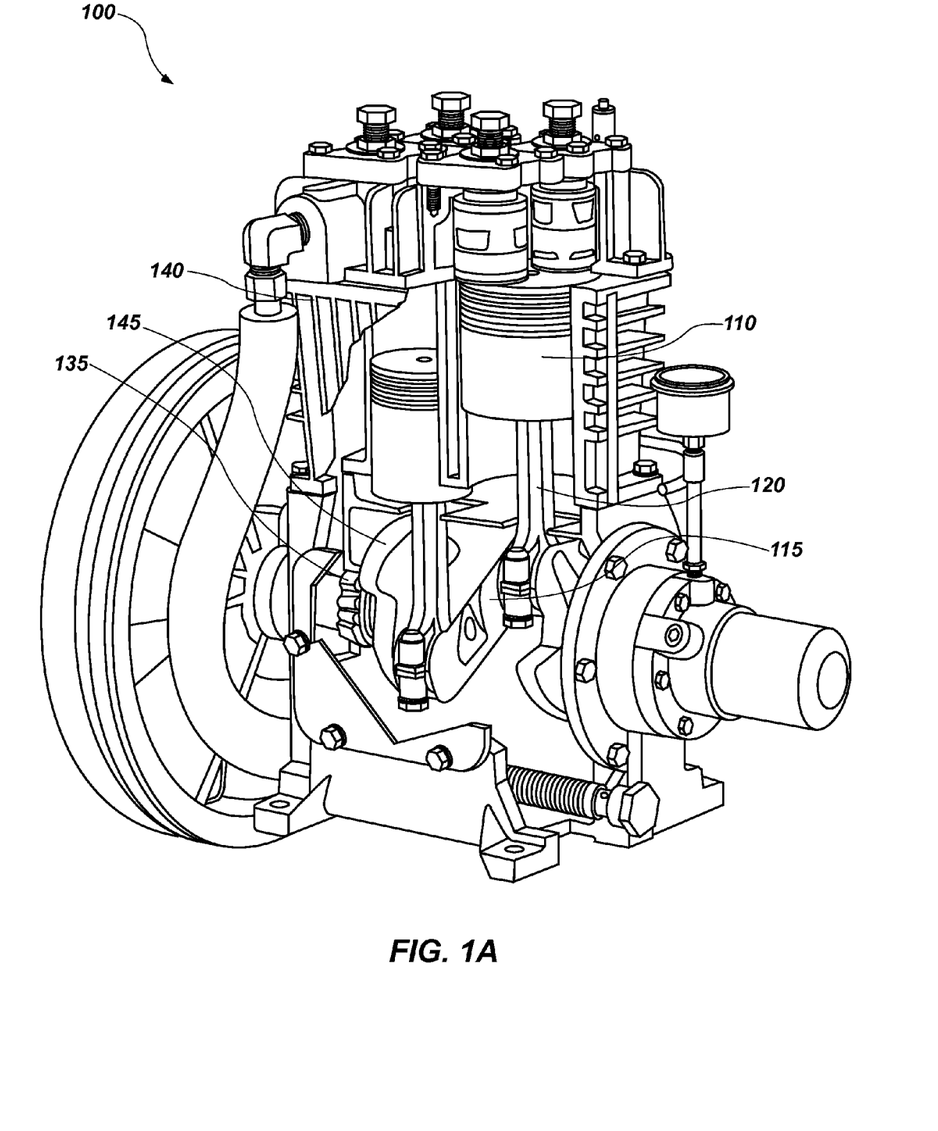
FIG. 1A is a partial cut-away view of an exemplary gas compressor according to one exemplary embodiment.
Figure 1B:
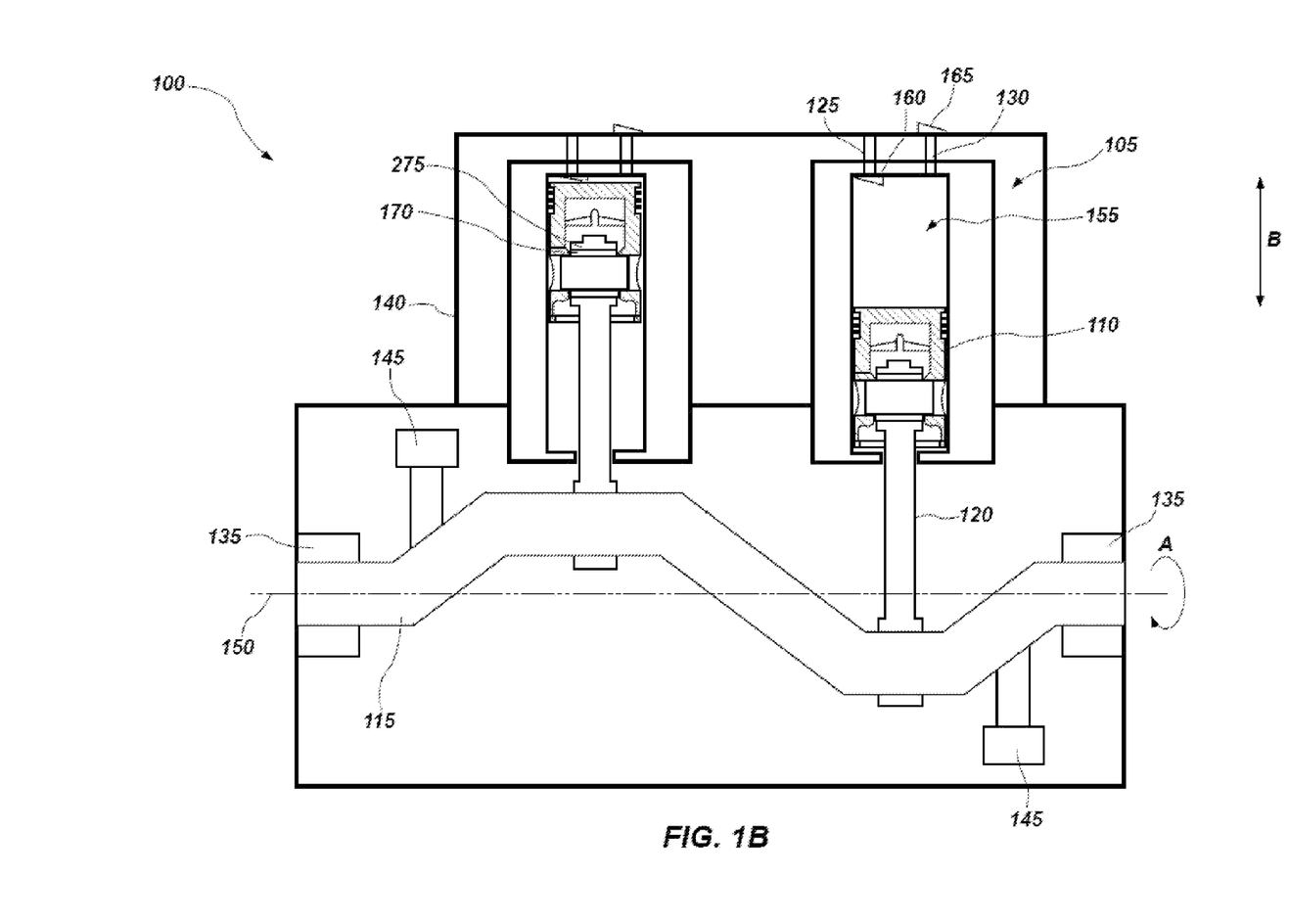
FIG. 1B is a side schematic view of an exemplary gas compressor according to one exemplary embodiment.

Referring now to FIGS. 1A and 1B, a gas piston compressor system 100 is illustrated. According to one exemplary embodiment, the compressor system 100 is configured to operate using sour gas. In some embodiments, the compressor system 100 may contain at least one cylinder 105, at least one piston 110, a crankshaft 115, at least one connecting rod 120, a gas inlet 125, a gas outlet 130, and one or more bearings 135. The compressor system 100 may be encased in a body 140, which may be, according to one exemplary embodiment, a substantially metallic material and may be a multi-component assembly. In some embodiments, the compressor system 100 may contain more components than those described herein.

In some embodiments, the compressor system 100 may include a crankshaft 115. The crankshaft 115 may have a one-piece or multi-piece configuration. In some embodiments, the crankshaft 115 may be rifle-drilled, machined, cast, printed, forged, or the like. In other embodiments, the crankshaft 115 may additionally include one or more counterweights 145. Maximizing the balanced construction of the crankshaft 115 may reduce vibration. Reducing vibration may extend the life of the bearings 135 associated with the crankshaft 115, among other components. For example, a reduction in vibratory loading on other components may reduce the likelihood of a friction event or wearing on a part which may lead to a system failure.

In some embodiments, the crankshaft 115 may have a substantially nonlinear shape as shown in FIG. 1B. The crankshaft 115 may rotate about an axis 150 as shown by arrow A. The axis 150 may be defined by two co-linear sections of the crankshaft 115. The crankshaft 115 may be mounted to the body 140 of the compressor system 100 via one or more bearings 135 which may further define the axis 150. The one or more bearings 135 may include, but are in no way limited to, tapered roller bearings, which may handle combined loads. For example, the tapered roller bearing may experience radial and axial loads. The radial loading may be a load applied to the bearing in a direction perpendicular to the axis 150. The axial loading may be applied parallel to the axis 150. In other embodiments, the one or more bearings 135 may include a combination of a roller bearing and a ball bearing. The roller bearing may experience radial loading while the ball bearing experiences axial loading. When the compressor system 100 is in operation, the crankshaft 115 may rotate 360 degrees around the one or more bearings 135 and about the axis 150.

Figure 2:
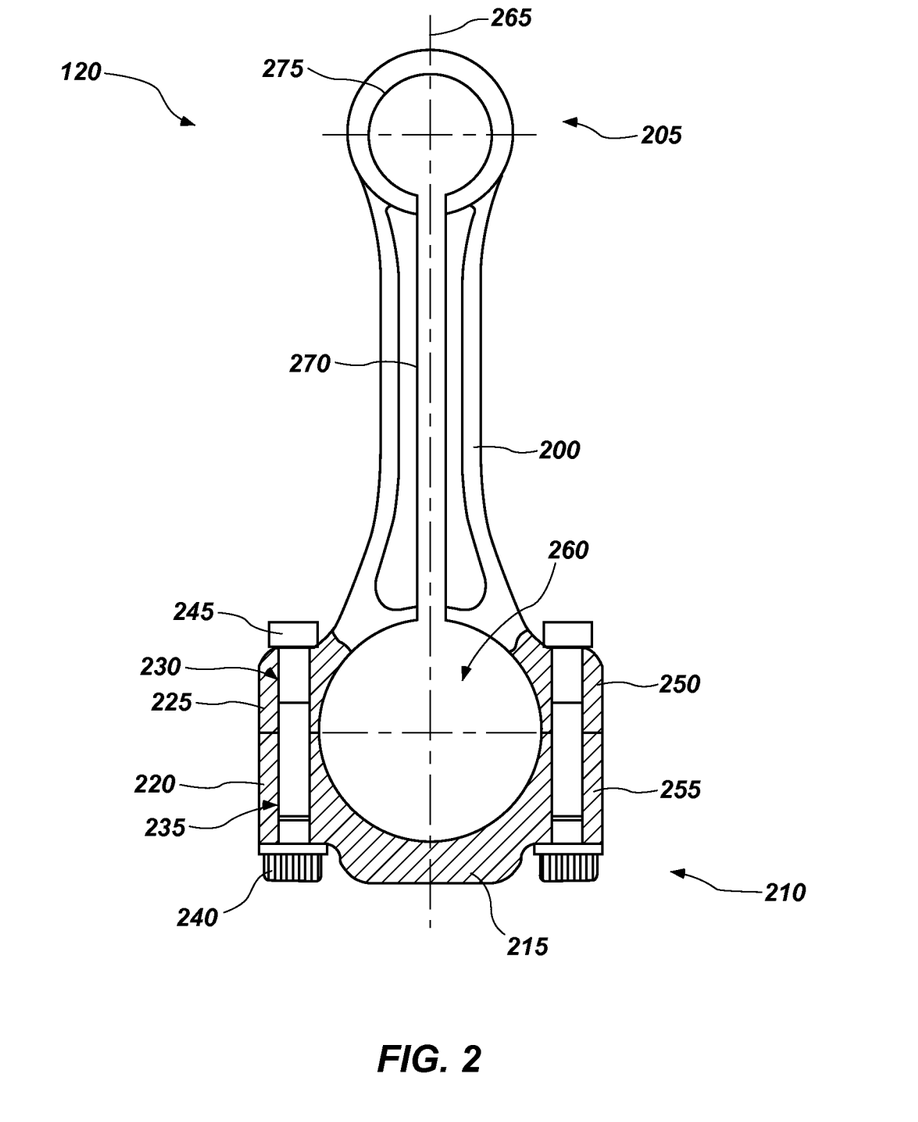
FIG. 2 is a side view of an exemplary connecting rod used in the gas compressor.

In some embodiments, a connecting rod 120 may be coupled to the crankshaft 115. As shown in FIG. 2, the connecting rod 120 may include a substantially elongated body 200 with a small end 205 and a big end 210, opposite the small end 205. The connecting rod 120 may be a metal and may be manufactured from one of a steel, aluminum, titanium, iron, an alloy, some combination thereof, or the like. The connecting rod 120 may also be machined, cast, forged, or the like. In some embodiments, the connecting rod 120 may be a single component coupled to the crankshaft 115. For example, in some embodiments, the big end 210 of the connecting rod 120 may be coupled to the crankshaft 115. For example, the big end 210 may be snap fit, adhered, clamped, screwed, or otherwise coupled to the crankshaft 115.

In alternative embodiments, the connecting rod 120 may be an assembly of multiple components. For example, the big end 210 may include a multi-piece assembly. For example, a bottom piece 215 of the connecting rod 120 may be affixed to the body 200 of the connecting rod 120. The bottom piece 215 may have one or more flanges 220 that mate with one or more flanges 225 on the body 200 of the connecting rod 120. For example, the flange 225 may contain a bolt-hole 230, which may align with a correlating bolt-hole 235 on the opposing flange 220. The flanges 220, 225 may then be coupled together using a bolt 240 and nut 245. In some embodiments, one of the bolt-holes 235 may be threaded, thereby negating the need for the nut 245. In another embodiment, the nut 245 may be affixed to one of the flanges 220, 225. For example, the nut 245 may be adhered, glued, welded, or the like to the flange 225. The bolt 240 may then pass through the flange 220 and may be secured to the flange 225 via the nut 245. The bottom piece 215 and the body 200 of the connecting rod 120 may additionally have another set of corresponding flanges 250, 255. The flanges 250, 255 may have a similar bolting configuration as flanges 220, 225. In alternative embodiments, the flanges 250, 255 may be connecting via a hinge mechanism, adhered, or other otherwise coupled together.

The bottom piece 215 and the body 200 of the connecting rod 120 may form a first circular passage 260. The first circular passage 260 may be substantially perpendicular to an axis 265 along the length of the body 200 of the connecting rod 120. The first circular passage 260 may have a diameter slightly larger than an outer diameter of the crankshaft 115. The larger sizing of the first circular passage 260 may allow the connecting rod 120 to freely rotate around the crankshaft 115. For example, the bottom piece 215 of the connecting rod 120 may be removed from the body 200. The big end 210 of the connecting rod 120 may be placed such that it substantially surrounds approximately half of the diameter of the crankshaft 115. The bottom piece 215 of the connecting rod 120 may then be placed substantially around the remaining half of the crankshaft 115 such that the first circular passage 260 is formed and substantially surrounds the crankshaft 115. The bottom piece 215 may then be affixed to the body 200 in any number of ways, including using the bolt 240 and nut 245 configuration.

In some embodiments, the body 200 of the connecting rod 120 may define a bore 270. The bore 270 may have a substantially cylindrical shape and have an axis parallel to the axis 265. In some embodiments, the axis of the bore 270 may be concentric with the axis 265 of the connecting rod 120. The bore 270 may allow a lubricant to travel from the first circular passage 260 to a second circular passage 275.

The second circular passage 275 may be located proximate the small end 205 of the connecting rod 120. The second circular passage 275 may be substantially parallel to the first circular passage 260. The second circular passage 275 may also be substantially perpendicular to the axis 265 of the body 200 of the connecting rod 120. In some embodiments, a center point of the second circular passage 275 may be substantially coincident with the axis 265. The second circular passage 275 may be sized to accept a piston pin 305. For example, FIG. 3 displays a schematic of a piston assembly 300 contained within a cylinder 105. The piston pin 305 may couple the connecting rod 120 to a piston 110.

Figure 3:
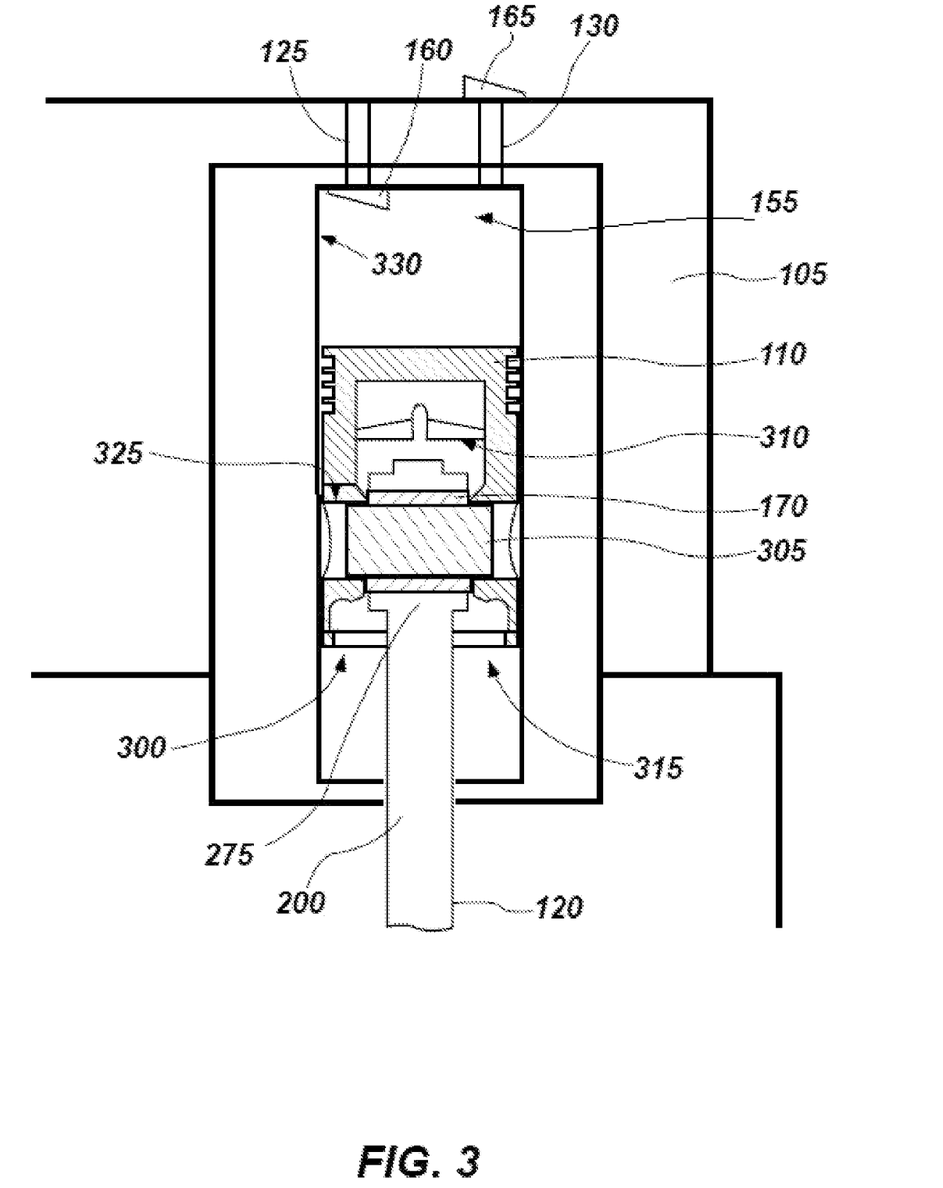
FIG. 3 is a cut-away side view of the piston assembly shown in FIGS. 1A and 1B, according to one exemplary embodiment.

Continuing to refer to FIG. 3, the piston 110 may be substantially cylindrical-shaped. The piston 110 may include aluminum, iron, an alloy, or other substantially metallic material. The piston 110 may be cast, forged, machined, or manufactured using any acceptable manufacturing method. In some embodiments, the piston 110 may include a cavity 310. The cavity 310 may be substantially-cylindrically hollow portion of the piston 110 and may be concentric with the body of the piston 110. In some embodiments, the cavity 310 may have an opening 315 on a bottom end 320 of the piston 110. In some embodiments, the piston 110 may have a thru hole 325. The thru hole 325 may be substantially perpendicular to the body of the piston 110. The thru hole 325 may have a generally circular shape, a generally square shape, a generally rectangular shape, or any other shape. The piston 110 may be sized such that it moves in a vertical direction within the cylinder 105. For example, an outer diameter of the piston 110 may be sized such that the piston 110 moves in a reciprocating motion within an inner surface 330 of the cylinder 105 indicated by arrows B.

The piston pin 305 may be substantially cylindrically shaped. The piston pin 305 may be a substantially hollow rod or may be a substantially solid rod. In some embodiments, the piston pin 305 may include steel, aluminum, titanium, metallic alloys, or the like. The piston pin 305 may be machined, forged, die cut, printed, or the like. The piston pin 305 may couple the small end 205 of the connecting rod 120 to the piston 110.

For example, in one embodiment, the second circular passage 275 may be sized slightly smaller than the piston pin 305. For example, the diameter of the second circular passage 275 may be smaller than an outer diameter of the piston pin 305. This may create an interference, or tight fit, between the piston pin 305 and the connecting rod 120. For example, the small end 205 of the connecting rod 120 may be substantially inserted into the cavity 310. The piston pin 305 may pass through a first portion of the thru hole 325. The piston pin 305 may then pass through the second circular passage 275 in the connecting rod 120 and into the second portion of the thru hole 325 as shown in FIG. 3. Due to the interference fit between the piston pin 305 and the connecting rod 120, the piston pin 305 and connecting rod 120 may be rigidly coupled together. The thru hole 325 on the piston 110 may be sized slightly larger than the outer diameter of the piston pin 305. This may allow the connecting rod 120 and piston pin 305 assembly to freely rotate in relation to the piston 110.

In an alternative embodiment, the piston pin 305 may freely rotate within the second circular passage 275, but be rigidly coupled to the piston 110. For example, the diameter of the second circular passage 275 may be sized slightly larger than the diameter of the piston pin 305. This may allow the connecting rod 120 to freely rotate about the piston pin 305. Consequently, the piston pin 305 may be coupled to the piston 110. For example, the piston pin 305 may be adhered to the piston 110 using glue, an interference fit, or the like. In some embodiments, the piston pin 305 may be screwed or clamped to the piston 110. In still further embodiments, clips such as circlips, c-clips, or the like may couple the piston pin 305 to the piston 110. According to one alternative embodiment, the piston pin 305 is not fixed to either the connecting rod 120 or the piston 110. Rather, it is free to move in relation to both the rod and the piston.

Continuing to refer to FIG. 3, which is a detailed view of FIG. 1B, in some compressor assemblies, the piston 110 may be assembled within the cylinder 105. The cylinder 105 may define a hollow compartment within the compressor system 100. In some embodiments, the cylinder 105 may be an integral piece of the compressor system 100 or it may be a separate component. The cylinder 105 may be made with cast-iron or any other appropriate materials. Further, the cylinder may be formed with any appropriate manufacturing method. For example, the piston may include aluminum, titanium, steel, another metal, a composite, another type of material, or combinations thereof. Likewise, the piston 110 may be cast, forged, machined, printed, or the like. In some embodiments, the piston 110 may be sized such that it fits within a hollow chamber 155 of the cylinder 105. The chamber 155 may be substantially cylindrically-shaped. Similarly, the piston 110 may be substantially cylindrically-shaped. An outer diameter of the piston 110 may be smaller than an inner diameter of the chamber 155 of the cylinder 105. As mentioned above, the piston 110 may be able to freely move in a vertical motion within the cylinder 105 as displayed by arrows B.

In some embodiments, gas may be able to enter the chamber 155 through a gas inlet 125. The gas may exit the chamber 155 via a gas outlet 130. In some embodiments, the gas inlet 125 and gas outlet 130 may include an inlet flap 160 and an outlet flap 165, respectively. In some embodiments, the flaps 160, 165 may include valves, or other like devices.

Figure 4:
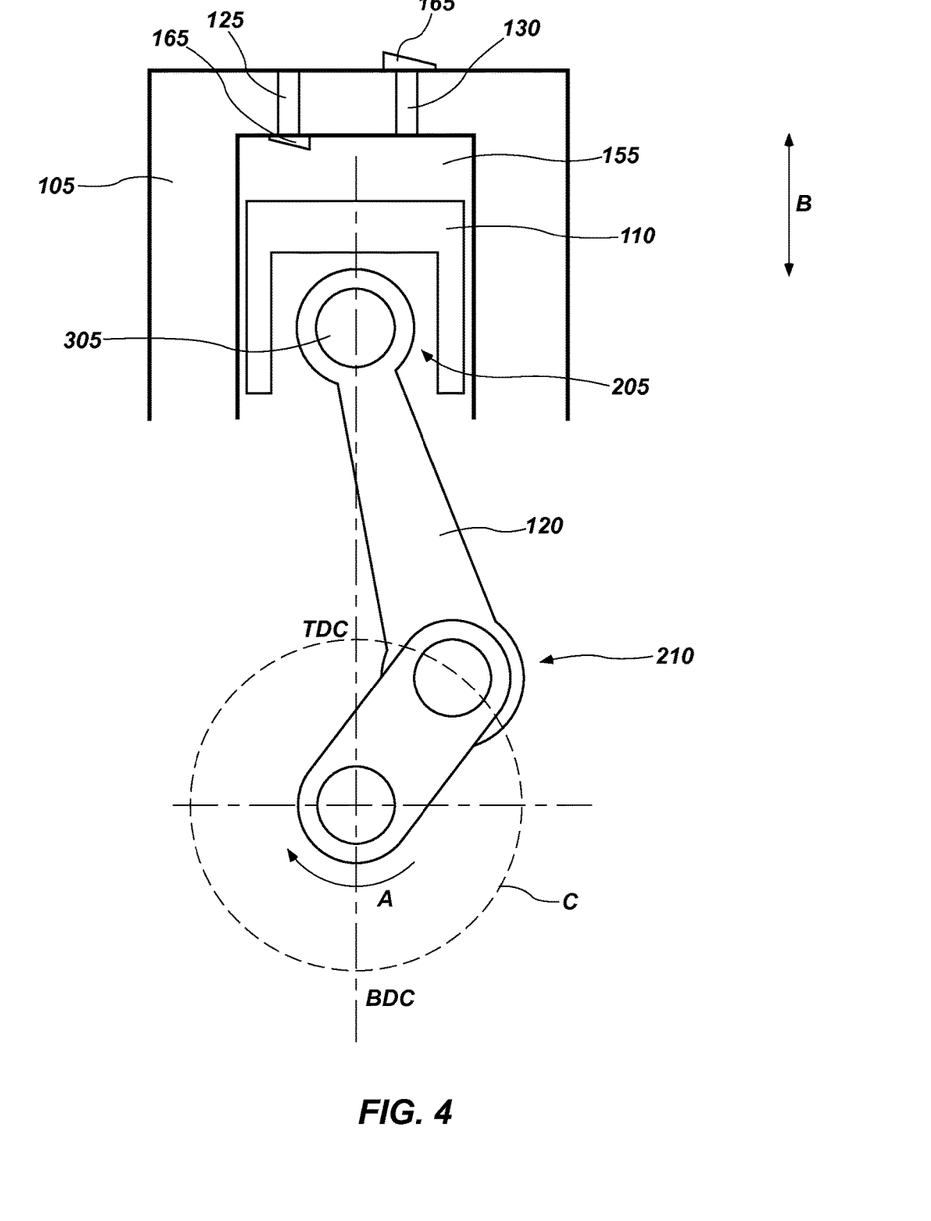
FIG. 4 is a side view of the piston assembly shown in FIGS. 1A, 1B, and 3, according to one exemplary embodiment.

In the example of FIG. 4, the piston 110 is coupled to the crankshaft 115 such that rotational motion of the crankshaft 115 results in reciprocating motion of the piston 110. For example, the big end 210 of the connecting rod 120 may be coupled to the crankshaft 115. Subsequently, the crankshaft 115 may cause the big end 210 of the connecting rod to rotate 360 degrees about the one or more bearings 135 (shown in FIG. 1B) at point "O." The big end 210 may follow the motion illustrated by the arrow A and the circuitous path C. The rotational movement of the big end 210 of the connecting rod 120 may cause a reciprocating motion in the small end 205 of the connecting rod 120, as illustrated by arrow B, which may be coupled to the piston 110. Therefore, in some embodiments, the connecting rod 120 may essentially swing about the piston pin 305 approximately twenty (20) degrees to approximately thirty (30) degrees.

The reciprocating motion reflected in the piston 110 may cause gas to be compressed. For example, as the big end 210 of the connecting rod 120 reaches bottom dead center ("BDC") of the path C, the piston 110 may travel downward in the cylinder 105. The downward motion of the piston 110 may cause gas to enter the cylinder 105. The downward motion of the piston 110 may cause a decrease in gas pressure inside the chamber 155. The decrease in gas pressure may subsequently cause the inlet flap 160 to open and allow more gas to enter into the chamber 155. Then, as the big end 210 of the connecting rod 120 begins its rotational movement toward top dead center ("TDC") of the circuitous path C, the piston 110 moves upward within the cylinder 105. The upward motion of the piston 110 may cause an increase in pressure within the chamber 155. The increase in pressure may cause the inlet flap 160 to close preventing gas from entering or exiting the chamber 155. As the big end 210 of the connecting rod 120 reaches TDC, the piston 110 also reaches the top of the chamber 155 of the cylinder 105. At this point, the gas that entered the chamber has been compressed to an excessive pressure such that the outlet flap 165 may open and allow the compressed gas to escape the chamber 155. The big end 210 of the connecting rod 120 will then continue around the circuitous path C towards BDC. As the pressure inside the chamber 155 decreases, the outlet flap 165 closes and the inlet flap 160 opens allowing gas to enter into the chamber 155. Thus the compression cycle continues.

During this process, the compressor system 100 may require lubrication. Components of the compressor system 100 move in relation to one another, which may cause rubbing and potential loading on the components. Friction and wear may be particularly severe in extreme environments, such as when compressing corrosive gasses such as sour gas. In one instance, the connecting rod 120 may exert a force, or load, on the piston 110 as the crankshaft 115 causes the piston 110 to move. The loading may cause wear on the piston 110, piston pin 305, and/or the connecting rod 120. A lubricant (not shown) may be added to the compressor system 100 to reduce wear caused by the load. The lubricant may be liquid or solid and may be oil based. An oil pump (not shown) may cause a liquid lubricant to flow through the compressor system 100.

In some embodiments, to further reduce the friction between the small end 205 and the piston pin 305, a bushing or bearing is used. For example, as shown in FIG. 1B, a bushing 170 is proximate the small end 205 of the connecting rod 120. The bushing 170 may be contained within the second circular passage 275 of the connecting rod 120. The bushing 170 may include a bronze material. However, a traditional bronze bushing may not be ideal in some sour gas compression applications. Specifically, sour gas contains high amounts of hydrogen sulfide, which may react with the bronze material causing corrosion.

In some embodiments, for sour gas applications, bushings may be replaced with one or more needle bearings (not shown). The one or more needle bearings may include a pair of needle bearings to allow a lubricant to flow between the bearings. However, needle bearings may increase cost, part count, and increase the risk of a failure. Additionally, if the needle bearings lack a lubricant, rollers contained with the bearing may start to slide instead of roll. In sour gas applications, blow-by gas from the cylinder may contaminate the lubrication oil inside the crank case, and which may cause the needle bearing to lose lubrication. The resulting sliding action may cause a wear surface in the bearing rollers. Furthermore, as noted above, in some embodiments, the connecting rod 120 may essentially swing about the piston pin 305 approximately twenty degrees to approximately 30 degrees. When needle bearings are used between the connecting rod 120 and the piston pin 305, the limited swing by the connecting rod 120 about the piston pin 305, along with the loss of lubrication, may result in non-lubricated needles at the bottom of the needle bearings to assume the loading from the piston. The wear surface may subsequently result in an increased temperature, wear on the bearing rings, and potential seizing of the rollers. Thus, the bushing 170 provides multiple advantages over the use of needle bearing, even in those cases where the needle bearings are also impregnated with a lubricant and have the ability to self-lubricate. For example, the solid continuous inner surface of the bushing 170 reduces the amount of blow-by gas that that can reach the lubricant. Further, the bushing 170 provides a smooth sliding surface that is well suited for rotationally sliding the pin or other components which is accomplished by having a higher radius of curvature. In contrast to the needle bearings with their low radius of curvature, when the needle bearings lose their ability to rotate, their surfaces impose higher amounts of friction between the pin 350 and the bushing 170. Further, the continuous surface of the bushing 170 provides lubrication and a bearing surface around the pin's entire circumference.

Figure 5A:
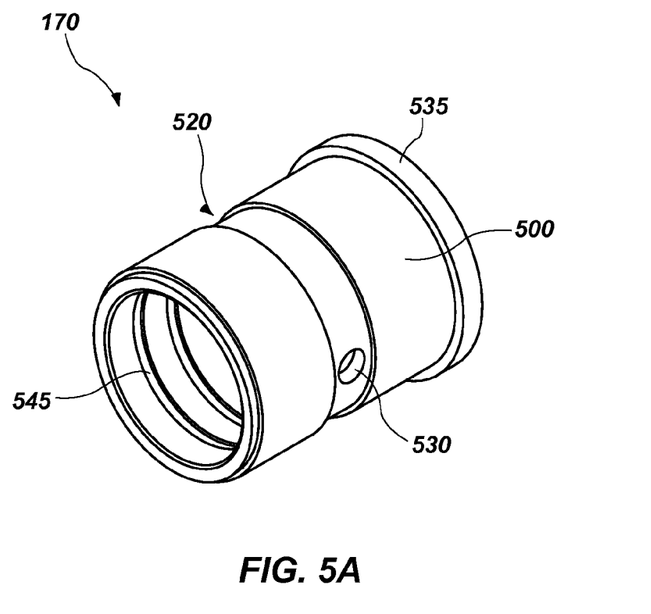
FIG. 5A is a cross-sectional view of an exemplary bushing, according to one exemplary embodiment.
Figure 5B:
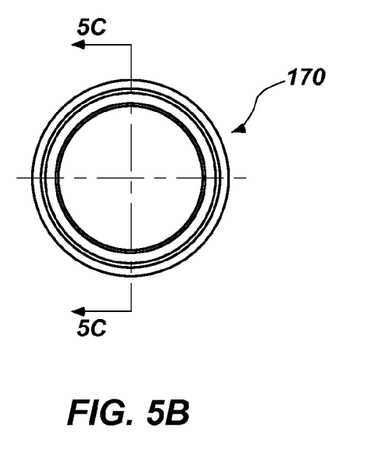
FIG. 5B is a side view of an exemplary bushing, according to one exemplary embodiment.
Figure 5C:
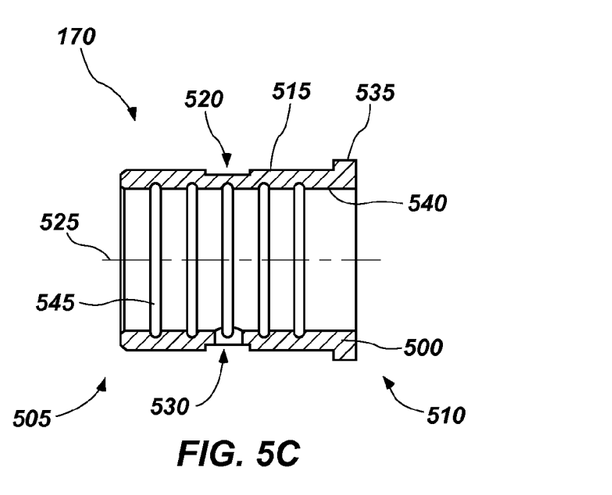
FIG. 5C is a front view of an exemplary bushing, according to one exemplary embodiment.

In one embodiment, as shown in FIGS. 5A-5C, a body 500 of the bushing 170 may include a hollow cylinder with a first end 505 and a second end 510 opposite the first end 505. The body 500 may also have an outer surface 515 and an inner surface 540 opposite the outer surface 515. In some embodiments, the outer surface 515 may have a transition fit with the connecting rod 120. For example, according to one exemplary embodiment the outer diameter of the body 500 may be such that the bushing 170 may be located within the second circular passage 275 of the connecting rod 120 during assembly without noticeable play. The transition fit may, according to various uses and embodiments, change from a close sliding fit to a loose running fit. The transition fit may prevent the bushing 170 from sticking due to heat expansion or loss of lubrication. In some embodiments, the inner surface 540 of the bushing 170 may be sized larger than the piston pin 305. This may allow for a loose fit. For example, the diameter of the inner surface 540 may be larger than the outer diameter of the piston pin 305. The loose fit may be, according to one exemplary embodiment, approximately a 0.001 to 0.010 inch clearance.

In some embodiments, the outer surface 515 of the body 500 may contain an external groove 520. The external groove 520 may be substantially perpendicular to a centerline 525 of the body 500. The external groove 520 may be substantially rectangular, annular, square, or the like. In some embodiments, the external groove 520 may extend around the circumference of the outer surface 515 of the bushing 170. The external groove 520 may be substantially concentric with the centerline 525 of the bushing 170. In further embodiments, the body 500 may contain a passage 530. The passage 530 may have a first opening proximate the outer surface 515, and a second opening, opposite the first opening, proximate the inner surface 540. The passage 530 may be located substantially within the external groove 520. The external groove 520 may align with bore 270. During operation, lubricant (not shown) may travel through the bore 270 (FIG. 3) into the external groove 520. The lubricant may then reach the inner surface 540 of the bushing 170. The lubricant may help cool the inner surface 540 of the bushing and may reduce any friction or wear between the bushing 170 and the piston pin 305. By designing the bushing 170 with the external groove 520, the external groove 520 may ensure the bushing 170 receives adequate lubrication during compressor operation.

In further embodiments, the outer surface 515 may also contain a lip 535. The lip 535 may be proximate the second end 510 of the bushing 170. The lip 535 may have an outer diameter larger than the diameter of the outer surface 515. In some embodiments, the lip 535 may have a substantially square-shaped cross-section and may extend around the circumference of the outer surface 515 of the body 500 of the bushing 170. In alternative embodiments, the lip 535 may be square, circular, or any other appropriate shape. The lip 535 may ensure the bushing 170 stays in the correct position. For example, the outer surface 515 of the bushing 170 may be sized such that the bushing 170 fits within the second circular passage 275 of the connecting rod 120 (FIG. 1). The second circular passage 275 may have a notch (not shown) in one side. The notch may be sized to accept the lip 535. By maintaining the position of the bushing 170 within the connecting rod 120, the lip 535 may ensure the bushing 170 maintains its location and that the lubricant path will not become blocked or interrupted.

The inner surface 540 of the body 500 of the bushing 170 may contain one or more internal grooves 545. The internal groove 545 may have cross-sectional shapes that are substantially circular, oval, square, rectangular, or the like. The internal groove 545 may extend throughout the inner surface 540. In some embodiments, the internal groove 545 may be substantially concentric to the centerline 525. In other embodiments, the inner surface 540 may contain a plurality of internal groves 545, and according to one specific embodiment, the inner surface 540 may include at least five internal grooves 545. The five internal grooves 545 may be proximate an inner surface 540 and, in some embodiments, may be substantially evenly spaced along the inner surface 540. The orientation of the internal grooves 545 may reduce the cost of the bushing 170 due to ease of manufacturing. In some embodiments, the internal grooves 545 may also aid in lubrication distribution. For example, the internal grooves 545 may allow a lubricant to be evenly distributed along the inner surface 540 by reducing pressure. For example, the lubricant may be a liquid such as oil and the internal grooves 545 may reduce the internal pressure of the liquid.

In some embodiments, the bushing 170 may include a metal. In other embodiments, the bushing 170 may include alternative materials. For example, according to one exemplary embodiment, the bushing 170 may include a substantially thermoplastic material. The thermoplastic material may be a nylon. In further embodiments, the thermoplastic may be lubricant-filled nylon. In still further embodiments, the thermoplastic may be Nyoil® (oil-filled) or Nycast® RX (solid lubricant filled). The bushing 170 may be injection molded, cast, extruded, printed, or the like. Using a thermoplastic bushing 170 may reduce the part count. For example, a single thermoplastic bushing 170 may replace two multi-piece needle bearing assemblies. The reduced part count may result in a cost savings from both a procurement and maintenance perspective. The single piece bushing 170 may also result in reduced assembly time.

Additionally, in some embodiments, the thermoplastic bushing 170 may weigh less than its metal counterparts or metal bearings. The lighter weight of the bushing 170 may reduce unbalanced inertial reciprocating force. This, in turn, may result in a smoother operation of the compressor system 100.

In some embodiments, the lubricant-filled nylon may result in a longer life span of the bushing 170. For example, if the compressor system 100 utilizes sour gas, the hydrogen sulfide present in the gas may not react with the nylon components. Additionally, a lubricant-filled nylon bushing 170 may result in a reduced coefficient of friction. For example, a bronze bushing may have a dynamic coefficient of friction of approximately 0.34. In contrast, a wear surface of the lubricant-filled nylon bushing 170 may have a coefficient of friction of between approximately 0.001 and approximately 0.20 and, in some embodiments, may be approximately 0.12. The reduced coefficient of friction may result in better wear of the bushing 170 during compressor operation.

Additionally, in some embodiments, a lubricant-filled nylon bushing 170 may continue to operate normally even if an external lubricant is not present. For example, the bushing 170 may lose lubrication from the connecting rod 120, the compressor lubrication may break down, the oil pump may have failed, the lubrication path may become blocked or the like. Because a lubricant-filled nylon bushing 170 is manufactured with lubricant as an integral part of the casting structure, the bushing 170 will self-lubricate, and thereby continue to operate normally even though an external source of lubricant is no longer provided. For example, as the bushing 170 moves rotationally with respect to a connecting rod (e.g. connecting rod 120) and/or the pin (e.g. pin 305), the mechanical forces imposed on the inner surface of bushing 170 may disrupt the inner surface and thereby release the lubricant. In some cases, the heat from the relatively movement between the bushing 170 and the other components induces the lubricant to flow from the bushing 170. For example, as the bushing wears, the wear surface may cause a liquid lubricant trapped in the bushing material to be released. Alternatively, the material of the bushing that wears may provide lubrication to the wear surface of the bearing. In another embodiment, the material of the bushing may fleck off, shave off, or slowly release into the system to provide lubrication.

Other benefits of using an oil-filled nylon bushing 170 may be present. For example, according to one exemplary embodiment, the oil-filled nylon bushing 170 may have a higher dimensional stability due to a higher crystallinity. Additionally, oil droplets may fill gaps within the amorphous structure of the nylon. This may prevent water from being absorbed into the nylon and result in an increased dimensional stability. For example, some thermoplastic products may absorb water during engine use and result in a loss of structural and dimensional integrity. However, an oil-filled nylon may have a low moisture absorption rate. For example, in some exemplary embodiments, an oil-filled nylon bushing 170 may have approximately 2%-3% moisture content, and may include a 2.5% moisture content.

In further embodiments, the bushing 170 may include other non-metallic materials. For example, other lubricant-filled thermoplastics may be utilized. The material may have a low moisture absorption rate, high strength and ease of manufacturing. In some embodiments, the thermoplastic may have additional fillers to provide strength and resilience. For example, the thermoplastic may have plasticizers added to decrease brittleness of the material.

While the technology of the present application is described with respect to a piston compressors, the technology disclosed herein may be applicable to other piston-based machines. Moreover, the technology disclosed herein will be described with reference to certain exemplary embodiments. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A connecting rod assembly, comprising:
a connecting rod having a bore configured to allow a lubricant to travel from a big end to a small end of the connecting rod;
a bushing with an inner surface and an outer surface, wherein the bushing comprises a lubricant-filled material, which is configured to release lubricant as the bushing wears;
a pin connectively coupled to a piston and the connecting rod at the small end;
wherein the bushing contacts the pin on the inner surface and the connecting rod on the outer surface; and
wherein the bushing comprises a body, wherein the body is a hollow cylinder having the outer surface and the inner surface, an external groove within the outer surface that is configured to align with the bore of the connecting rod, wherein the external groove is substantially concentric with and perpendicular to a center line extending in an axial direction of the hollow cylinder, a plurality of internal grooves on the inner surface of the hollow cylinder, wherein the plurality of internal grooves are parallel with a radial plane which is perpendicular to the center line extending in the axial direction of the hollow cylinder, and a passage extending through a wall of the hollow cylinder having a first opening proximate the outer surface and a second opening proximate the inner surface in a way such that, during operation, the lubricant travels through the bore into the external groove to the inner surface, wherein friction on the body causes the bushing to self-lubricate when the bushing moves rotationally with respect to the connecting rod.

2. The connecting rod assembly of claim 1, wherein the bushing self-lubricates when the bushing rotationally moves with respect to the pin.

3. The connecting rod assembly of claim 1, wherein the bushing comprises a lubricant-filled thermoplastic.

4. The connecting rod assembly of claim 1, wherein the bushing comprises a lubricant-filled nylon.

5. The connecting rod assembly of claim 1, wherein the bushing has a wear surface with a coefficient of friction of between 0.1 and 0.2.

6. The connecting rod assembly of claim 1, wherein the multiple internal grooves distribute the lubricant along the inner surface when the lubricant is introduced to the bushing.

7. The connecting rod assembly of claim 1, further comprising: a lip proximate an end of the bushing, wherein the lip has an external surface with a diameter larger than the outer surface of the hollow cylinder and configured to engage with a notch in the small end of the connecting rod to maintain the position of the bushing within the connecting rod.

8. A compressor system, comprising:
a piston,
a crankshaft in mechanical communication with the piston,
a connecting rod coupled to the piston at a small end and coupled to the crankshaft at a big end opposite the small end, said connecting rod having a bore configured to allow a lubricant to travel from the big end to the small end of the connecting rod;
a pin coupled to the piston and the connecting rod at the small end;
a bushing with an inner surface and an outer surface, wherein the bushing contacts the pin on the inner surface and the connecting rod on the outer surface, wherein the bushing comprises a lubricant-filled material, which is configured to release lubricant as the bushing wears;

wherein the bushing comprises a body, wherein the body is a hollow cylinder having the outer surface and the inner surface, an external groove within the outer surface that aligns with the bore of connecting rod, wherein the external groove is substantially concentric with and perpendicular to a center line extending in an axial direction of the hollow cylinder, a plurality of internal grooves on the inner surface of the hollow cylinder, wherein the plurality of internal grooves are parallel with a radial plane which is perpendicular to the center line extending in the axial direction of the hollow cylinder, and a passage extending through a wall of the hollow cylinder having a first opening proximate the outer surface and a second opening proximate the inner surface in a way such that, during operation, the lubricant travels through the bore into the external groove to the inner surface, wherein friction on the body causes the bushing to self-lubricate when the bushing moves rotationally with respect to the connecting rod.

9. The compressor system of claim 8, wherein rotational movement of the crankshaft causes reactionary reciprocating movement of the piston.

10. The compressor system of claim 8, wherein the bushing comprises a lubricant-filled thermoplastic.

11. The compressor system of claim 10, wherein the lubricant-filled thermoplastic comprises a nylon.

12. The compressor system of claim 8, wherein the bushing has a wear surface with a coefficient of friction between 0.001 and 0.2.

13. The compressor system of claim 8, wherein the inner surface of the bushing has an inner diameter that is greater than an outer diameter of the pin such that coupling the bushing to the pin results in a loose fit.

14. The compressor system of claim 8, wherein the compressor system comprises a sour gas compressor system.

15. The connecting rod assembly of claim 1, wherein the bushing comprises metal.

16. A connecting rod assembly, comprising:
a connecting rod having a bore configured to allow a lubricant to travel from a big end to a small end of the connecting rod;
a bushing comprising an inner surface, an outer surface, and lubricant, said bushing configured to release its lubricant as the bushing wears;
a pin connectively coupled to a piston and the small end of the connecting rod;
wherein the bushing contacts the inner surface of the pin and the outer surface of the connecting rod;
wherein the bushing further comprises a body, and the body comprises a hollow cylinder having the outer surface and the inner surface, an external groove within the outer surface that is configured to align with the bore of the connecting rod, and a plurality of internal grooves on the inner surface of the hollow cylinder,
wherein the external groove is concentric with and perpendicular to a center line extending in an axial direction of the hollow cylinder,
wherein the plurality of internal grooves are parallel with a radial plane which is perpendicular to the center line extending in the axial direction of the hollow cylinder, and
a passage extending through a wall of the hollow cylinder having a first opening proximate the outer surface and a second opening proximate the inner surface, and configured such that, during operation, the lubricant travels through the bore into the external groove to the inner surface, and
wherein friction on the body causes the bushing to self-lubricate when the bushing moves rotationally with respect to the connecting rod.

* * * * *